(12) United States Patent
Vincent et al.

(10) Patent No.: US 9,924,448 B2
(45) Date of Patent: Mar. 20, 2018

(54) DEVICE FOR SHORT-RANGE COMMUNICATION, ADAPTED TO PROVIDE ACCESS TO A REMOTE SERVICE

(71) Applicant: Orange, Paris (FR)

(72) Inventors: Yoann Vincent, Cachan (FR); Dimitri Bricheteau, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/193,954

(22) Filed: Jun. 27, 2016

(65) Prior Publication Data

US 2016/0381624 A1 Dec. 29, 2016

(30) Foreign Application Priority Data

Jun. 26, 2015 (FR) ...................................... 15 55997

(51) Int. Cl.
*H04B 5/00* (2006.01)
*H04W 48/14* (2009.01)
(Continued)

(52) U.S. Cl.
CPC ............ *H04W 48/14* (2013.01); *G06F 21/60* (2013.01); *H04L 12/283* (2013.01); *H04L 61/1541* (2013.01); *H04L 63/0884* (2013.01); *H04L 67/16* (2013.01); *H04L 67/289* (2013.01); *H04L 67/2842* (2013.01); *H04L 67/2871* (2013.01); *H04N 21/2351* (2013.01); (Continued)

(58) Field of Classification Search
CPC ..... H04W 48/14; H04W 4/008; H04W 12/02; H04W 76/021; H04W 84/12; H04B 5/0031; H04B 5/02
See application file for complete search history.

(56) References Cited

U.S. PATENT DOCUMENTS 9,037,683 B1  5/2015 Yoden
2010/0064045 A1* 3/2010 Jalkanen ............. H04L 41/5022
709/227
(Continued)

FOREIGN PATENT DOCUMENTS

FR        1455798 A     5/1966
WO   2015197956 A1    12/2015

OTHER PUBLICATIONS

French Search Report dated Apr. 20, 2016 for corresponding French Application No. 1555997, filed Jun. 26, 2015.
(Continued)

*Primary Examiner* — Nguyen Vo
(74) *Attorney, Agent, or Firm* — David D. Brush; Westman, Champlin & Koehler, P.A.

(57) ABSTRACT

A hub device is configured for communicating with a terminal by using a short-range wireless connection. The hub device is further configured for connecting to a remote service. More particularly, the device is configured for: receiving from the terminal a request to access the remote service, the access request comprising identification parameters for said service; temporarily storing in memory the identification parameters of the request received, in order to send to the remote service a second access request comprising the identification parameters; and upon response from the remote service to the second request, transferring data relating to the service.

10 Claims, 4 Drawing Sheets

(51) Int. Cl.
  *G06F 21/60* (2013.01)
  *H04L 12/28* (2006.01)
  *H04L 29/06* (2006.01)
  *H04N 21/41* (2011.01)
  *H04W 4/00* (2018.01)
  *H04W 12/02* (2009.01)
  *H04L 29/08* (2006.01)
  *H04L 29/12* (2006.01)
  *H04W 76/02* (2009.01)
  *H04N 21/235* (2011.01)
  *H04N 21/254* (2011.01)
  *H04N 21/436* (2011.01)
  *H04N 21/4367* (2011.01)
  *H04W 84/18* (2009.01)

(52) U.S. Cl.
  CPC ..... *H04N 21/2541* (2013.01); *H04N 21/4126* (2013.01); *H04N 21/4367* (2013.01); *H04N 21/43615* (2013.01); *H04W 4/008* (2013.01); *H04W 12/02* (2013.01); *H04W 76/021* (2013.01); *H04L 2012/2841* (2013.01); *H04L 2012/2849* (2013.01); *H04W 84/18* (2013.01)

(56) References Cited

U.S. PATENT DOCUMENTS

2010/0080202 A1* 4/2010 Hanson ............... H04L 63/0853
  370/338
2014/0354441 A1 12/2014 Luna
2015/0071071 A1* 3/2015 Hughes ................ H04L 47/125
  370/235

OTHER PUBLICATIONS

"Guidelines for Implementation of REST", Mar. 25, 2011 (Mar. 25, 2011), pp. 1-19, XP055267226.

English Translation of the French Written Opinion dated Apr. 20, 2017 for French Application No. 1555997, filed Jun. 26, 2015.

* cited by examiner

DEVICE FOR SHORT-RANGE COMMUNICATION, ADAPTED TO PROVIDE ACCESS TO A REMOTE SERVICE

CROSS-REFERENCE TO RELATED APPLICATION

This Application claims priority to and the benefit of French Patent Application No. FR 15 55997, filed Jun. 26, 2015, the content of which is incorporated herein by reference in its entirety.

FIELD OF THE DISCLOSURE

The present disclosure relates to the field of short-range communication between electronic devices.

BACKGROUND OF THE DISCLOSURE

Within a family local area network (for example the local area network—wireless or wired—created by the Internet gateway in a home), the number of multimedia features associated with the connected electronic devices has increased significantly in recent years. These devices include wireless audio speakers, USB flash drives, presence detectors, headphones, etc.

In order to interact with these devices (to configure them or view their contents, for example), and facilitate the user experience when interacting with these electronic devices, the Applicant has proposed, in addition to a residential gateway (such as Livebox® for example), a communication device in the form of a multimedia box, in particular for sharing content between household devices. Such a communication device, marketed under the name "Homepoint"®, functions as a hub for all connected WiFi/Bluetooth household devices. In one current implementation, when pairing this hub device with the residential gateway, synchronization occurs via WiFi and the hub device identified on the network (such as "Homepoint") can then share its content with the gateway's local area network (LAN), and in particular with all WiFi/Bluetooth devices connected to this LAN.

Once the residential devices have been connected, in order to play music or a movie or view photos or files, one simply selects the corresponding option on a programming interface provided on the Homepoint hub device in order to choose a content source among the household devices. The hub device is also connected to one or more playback devices (by a jack for example for music) for playing or viewing the selected content.

However, the hub device is not configured (or protected) for providing access to external applications. For example, one cannot use such a device to access cloud storage services ("cloud storage" in the following) or to receive streamed content ("streaming" in the following) for subscribers to such streaming services.

SUMMARY

For this purpose, it proposes a hub device (such as "Homepoint®" described above) configured for communicating with a terminal by means of a short-range wireless connection, the hub device being further adapted for connecting to a remote service. More particularly, the device is configured for:

/a/ receiving from the terminal a request to access the remote service, the access request comprising identification parameters for said service, /b/ storing in memory the identification parameters of the request received, in order to send to the remote service a second access request comprising the identification parameters, /c/ upon response from the remote service to the second request, transferring data relating to the service, the storing in memory of the identification parameters of the request received from the terminal being, in particular, temporary.

Thus, an unauthorized user cannot regain access to the remote service using the identification parameters of a previous user. For example, for a cloud storage service, the account of each user of the hub device, for connecting to the service, is only accessible temporarily, according to an exemplary embodiment of the disclosure. Another user therefore cannot access the service and access the data (photos, videos, etc.) of an account of a previous user of the hub device. Such an embodiment advantageously improves the privacy and security of the use of the device of an exemplary embodiment.

In one embodiment, the device is further configured to delete the identification parameters from memory, at least upon detection of the end of a data transfer. For example, in the case of transferring (private) data to the cloud, after a period of inactivity in the transfer (possibly after a specified time delay), the device can erase from its memory the identification parameters used to access the account for this service.

Additionally or alternatively, the device may be further configured to delete the identification parameters from memory after detecting a disconnection between the terminal and the hub device. For example, it may be provided that for a streaming service (subscription service such as Deezer® for example), the identification parameters that were given by a terminal for which a disconnection with the hub device has been detected are erased. Here again, the transfer of streaming data stops and the service is interrupted.

In one embodiment, the hub device may be configured to access the remote service via a gateway between a local area network (LAN) and a wide area network (WAN), the remote service being accessed over the WAN. For example, in this embodiment the aforementioned disconnection of the terminal from the hub device may more generally correspond to the fact that the terminal has left the LAN.

In one embodiment, the hub device comprising a plurality of connection ports, the hub device may be further configured for:
  identifying a port of the device based on the request, and
  upon response from the remote service to the second request, associating the identified port with the remote service.

Such an embodiment advantageously allows directly addressing the port for connecting to a device able to use or cooperate with the remote service, without a user having to designate the device. As such, this embodiment can be the object of separate protection.

For example, in the case of a remote service including the use of data from the terminal (such as a cloud storage service, uploading data from the terminal such as photos, videos, etc.), the hub device may comprise at least one port for connecting to storage memory, such that the hub device may be further arranged for:

receiving from the terminal the request to access the remote service, and data to be transferred to the remote service, identifying, based on the request, the port for connecting to the storage memory, in order to store in the storage memory the data received from the terminal, and upon response from the remote service, transferring the data from the storage memory to the remote service.

Such an embodiment is advantageous, as the hub device serves as the buffer memory between the terminal and the remote service. The terminal is thus freed for use in applications other than the transfer of data to the remote service.

Advantageously, the hub device may be further arranged to delete from the storage memory the data received from the terminal, at least upon detecting the end of a data transfer. This embodiment allows making such stored data inaccessible to subsequent users, for example.

In another exemplary embodiment in which the remote service includes a transmission of multimedia data to be read by a multimedia rendering device (for example for a streaming session), the hub device may comprise at least one port for connecting to a multimedia rendering device, and may be further arranged for:

receiving from the terminal the request to access the remote service, identifying, based on the request, the port for connecting to a multimedia rendering device capable of reading a type of multimedia data associated with the request, and upon response from the remote service, transferring the data to said rendering device capable of reading the type of multimedia data associated with the request.

In one embodiment which enables identification of usable ports for the service, the hub device is adapted for connecting to the remote service via a programming interface, in order to send via the programming interface said second request to access the remote service. In particular, the programming interface uses a lookup table to identify a port for the device based on the request and to associate the identified port with the remote service. The lookup table can thus establish a relationship between the remote service or type of remote service, and the port(s) to be activated in order to use this service (or type of service). This lookup table may also indicate the type of detection to be implemented before erasing the identification parameters, based on the service (or type of service required): for example, after disconnecting the terminal (for a streaming service) or after the end of a data transfer (for a cloud storage service). This lookup table may be stored in memory of the hub device, accessible to the programming interface.

The disclosure also provides a method for connecting to a remote service via a hub device within the meaning of the disclosure, the hub device then being configured for communicating with a terminal requesting access to the service via a short-range wireless connection, the hub device being further adapted for connecting to the remote service. The method thus comprises the steps implemented by the hub device:

/a/ receiving from the terminal a request to access the remote service, the access request comprising identification parameters for said service, /b/ storing in memory the identification parameters of the request received, in order to send to the remote service a second access request including the identification parameters, /c/ upon response from the remote service to the second request, transferring data relating to the service, the storing in memory of the identification parameters of the request received from the terminal being temporary.

A computer program implementing all or part of the method described above, installed on an existing device, is advantageous in itself.

The disclosure therefore also provides a computer program comprising instructions for implementing the method described above, when the program is executed by a processor.

This program may use any programming language (for example object language or other language), and may be in the form of interpretable source code, partially compiled code, or fully compiled code.

Figure 2A:
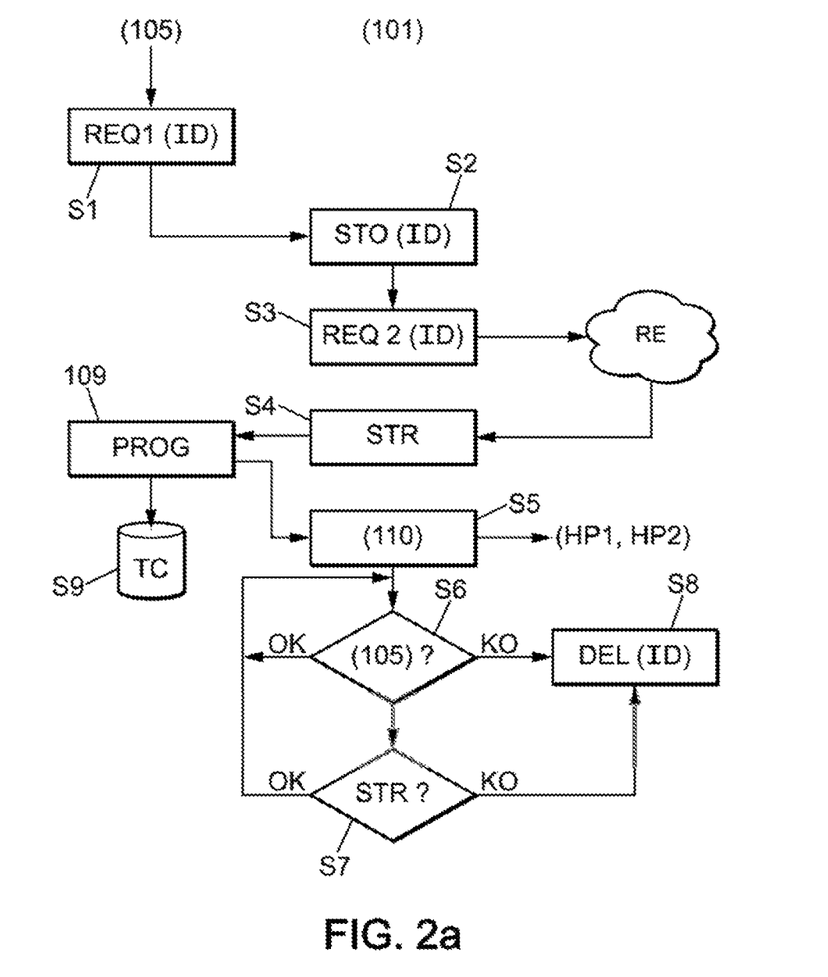
FIG. 2a shows a flowchart implemented by a hub device, in a first application of the disclosure.
Figure 2B:
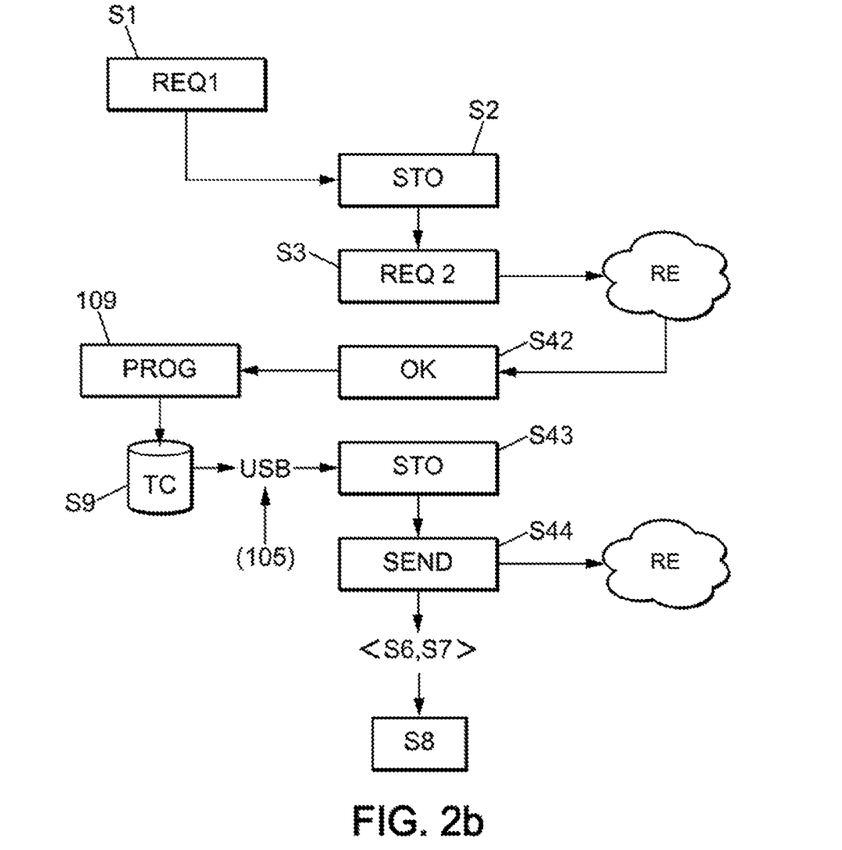
FIG. 2b shows a flowchart implemented by a hub device, in a second application of the disclosure.

FIGS. 2a and 2b, described in detail below, can serve as the flowchart of the general algorithm of such a computer program.

BRIEF DESCRIPTION OF THE DRAWINGS

Other features and advantages of one or more embodiments of the disclosure will become apparent from the following description. This description is purely illustrative and is to be read with reference to the accompanying drawings in which.

DESCRIPTION OF EMBODIMENTS OF THE DISCLOSURE

The disclosure relates to the use of a hub device (such as "Homepoint"®) as the identification relay for a terminal, providing identification to services such as cloud storage or receiving online media content (music, video, or other content).

Such a hub device is described in detail in particular in French Patent Application No. 20140055798.

Figure 1:
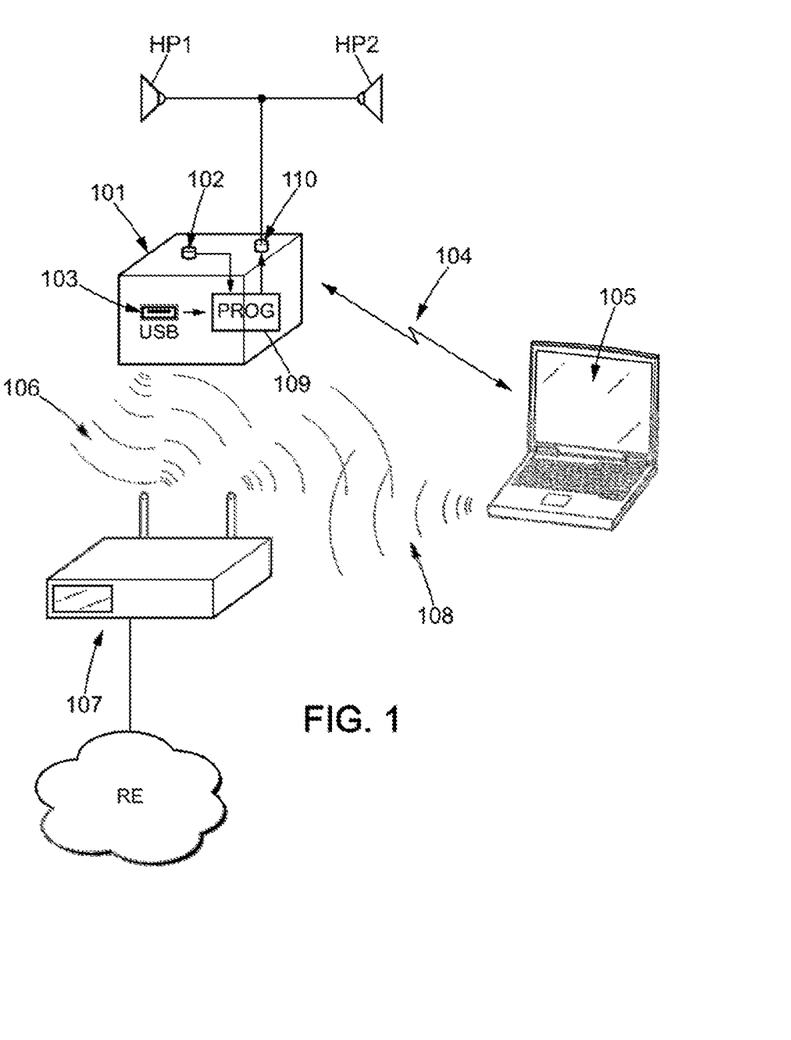
FIG. 1 illustrates a LAN comprising a hub device according to one embodiment of the disclosure.

FIG. 1 illustrates a LAN, managed by a gateway 107, and to which is connected a hub device 101 according to one embodiment of the disclosure.

In this embodiment, the hub device 101 comprises several means of interaction connected to a programming interface 109:

a button 102 which a user interacts with by pressing it according to a specified process (for example a short press, a long press, etc.)

a USB port 103 which a user interacts with by inserting a USB flash drive or other USB device.

Of course, the communication device may include other interaction devices such as Firebolt, HDMI, Ethernet, jack (denoted 110 in FIG. 1) or any other type of port, in particular for connecting to multimedia rendering devices (speakers denoted HP1 and HP2 in FIG. 1, screen, or other device).

During an interaction with at least one means of interaction, the hub device 101 may search for nearby terminals 105. This search can take several forms:

broadcasting a packet on the LAN, to the connected devices;

activating an NFC (near field communication) transmitter/receiver;

broadcasting a packet on a wireless network (for example on a Bluetooth or Bluetooth Low Energy (BLE) network). The packet may then be an IBeacon™ packet.

The fact that the device 101 searches for nearby terminals 105 means that this device 101 places itself in a configuration able to detect a nearby terminal 105 (for example activation of an NFC receiver) or able to allow detection by a nearby terminal 105 of the presence of the device 101 (for example broadcasting a message on a network).

The network 104 used for this detection may advantageously be separate from the WiFi network (LAN) created by the Internet gateway 107.

After the proximity between the terminal 105 and the device 101 has been detected (for example a distance below a predetermined threshold is detected), the terminal 105 can contact the device 101 via the LAN created by the residential Internet gateway 107 (for example WiFi or wired). It is therefore necessary that the device 101 be connected to this LAN (link 106) and that the terminal 105 be connected to this LAN (link 108).

The contact address (for example the IP address of the device 101) can be preconfigured in the terminal 105. The contact address could also be determined by a network discovery mechanism such as "Hello", "Avahi", "Pastry", "Zeroconf", "UPnP", "SNMP", etc.

The terminal 105 can then make a request to the device 101.

As the hub device 101 is connected to the gateway 107, via the gateway the device 101 can access a remote service available over the WAN (Internet).

Specifically, the device 101 may provide the terminal 105 with access to predefined services via APIs ("Application Program Interface") programs. Via a dedicated application on the terminal 105 using said APIs, a user can use the terminal 105 to request that the device 101 connect to a remote service (as a purely illustrative example, an audio streaming application such as Deezer®).

Thus, in step S1 of FIG. 2a, the terminal 105 provides the device 101 with access parameters (typically including identification parameters ID for the service) in a first request REQ1. In step S2, the device 101 temporarily stores (for example in its volatile memory) these identification parameters ID. Once this step S2 is carried out, any new connection request from the terminal 105 for this service can reuse the identification parameters ID saved by the device 101 if need be.

The device 101 can then formulate a second request REQ2, created for example by its programming interface 109, and thus identifies itself to the service in step S3, in order to receive in step S4 the audio streaming data associated with the streaming service, via the gateway 107. In step S5, the device 101 sends the audio data over one of its ports (for example the jack 110) connected in this exemplary embodiment to an audio playback device comprising speakers HP1, HP2 (such as speakers connected via Bluetooth).

Then, if the user interrupts the streaming sequence in step S6 or if, for example, the device 101 detects that the terminal 105 has left the LAN, the device 101 can then delete the identification parameters ID from its memory in step S8. Similarly, when the data transfer becomes inactive, meaning in this embodiment the streaming has completed in step S7, the device 101 can erase the identification parameters from its memory in step S8, possibly after a time delay. Thus, the end of the data transfer can dictate the deletion of the identification parameters, based on test S7.

In addition, in another advantageous feature of an embodiment of the disclosure (which may also be the object of separate protection), as the hub device 101 comprises a plurality of ports (USB, jack, etc.), the port addressing enabling use of the service on appropriate equipment should be managed properly. Here, as the second request to access the remote service REQ2 is issued via the programming interface 109, the latter 109 can advantageously refer to a lookup table TC (stored in non-volatile memory, for example) in step S9, in order to identify a port of the device 101 based on the request and suitable for using the remote service. Furthermore, the programming interface 109 may manage the (temporary) storage of several identifiers ID at a time, for different services and/or for different terminals of the LAN.

The requested service by necessity makes use of at least one port of the device 101. For the audio streaming application presented above, the audio jack 110 output is used. However, for other applications such as cloud storage, a port is requested that is connected to a mass storage medium, such as a USB flash drive, external hard drive, or SD card containing data to be stored. In this case, the requested port is an input port, while in the application described above with reference to FIG. 2a, the requested port was an output port. The port is a function of the service, and therefore of the access request sent. Therefore a second application of an embodiment of the disclosure is described below with reference to FIG. 2b, relating to a data transmission for cloud storage, requesting an input port of the hub (USB port 103 in this example). Steps S1, S2, S3; S6, S7, S8 and S9 are similar to those described above with reference to FIG. 2a and are not described again here.

In the embodiment of FIG. 2b, the service request sent from the terminal 105 in step S1 consists of a request to store data in the cloud. After the remote service accepts the receiving of data to be stored in the cloud in step S42, the programming interface executes step S9 of determining the port to be used to implement the service. In this embodiment, the programming interface indicates the USB port 103 because, advantageously, in step S43 the temporary storage of data to be sent later to the cloud in step S44 is provided. Here, the terminal 105 connects to the hub device 101 in order to send, in addition to the service request REQ1, the data to be stored in the cloud. In particular, the device 101 temporarily stores the data on a USB flash drive or on an external hard drive connected to the port 103 (step S43). The terminal 105 is thus freed from the data transfer and can be used for other applications, while the hub device 101 is responsible for the transmission of data from its USB port 103 (step S44) to a remote server providing the cloud storage service.

Here, when the data transfer becomes inactive, meaning in this exemplary embodiment that all data to be stored in the cloud has been sent in step S7, the device 101 may erase the identification parameters from its memory in step S8, possibly after a time delay. It is possible not to carry out step S6, so that the terminal 105 can leave the LAN without interrupting the transmission of data to the cloud.

Because in some cases the uploading of content (photos, videos, music) to the cloud can be time-consuming (an ADSL line having a limited upload speed), it is advantageous to use the hub device 101 as a "service way station." It is possible to have an application installed in such a hub device 101, for associating different services to it (this application being executed for example by the programming interface 109). Via such an application, it is possible to select content (photos, music, videos), stored for example on a USB flash drive connected via port 103, and then to select the service and a folder in the cloud where the content is to be copied. As detailed above, the content and the service connection information are transferred to the hub device 101 (directly from the USB flash drive, starting from steps S9 and S43 in FIG. 2*b*). The content may also be temporarily copied to local memory of the hub device 101 (when receiving data from a terminal 105 via a wireless link).

Examples of possible applications include a camera memory card that can be connected to the hub device 101. Via the application found on the hub device 101, it is possible to select photos and/or videos, and then the "Onedrive®" cloud service for example (or any other cloud service) to which the content is to be sent. The content is then copied for example and advantageously to a USB flash drive connected to the hub device 101, the connection information for the Onedrive account also being transferred.

The hub device 101 then transfers the content to the cloud service. The account details are not then stored by the hub device 101.

This feature can be used by each member of the family, with each user having their own account and transferring their content to their own cloud account. This feature can also be used by a visitor who does not intend to use the hub device 101 at a later time. Advantageously, his or her account access information will then be deleted so it cannot be reused by a malicious third party.

In addition, advantageously, the application executed by the hub device 101 has APIs for the cloud service, or for other services, for example for a streaming service (audio, video or other). In the latter case, for example for an online music service, the application corresponding to the service is associated with the application executed by the hub device 101. In this case, the user can send the hub device 101 a list of music tracks with his or her account information. This playlist is then played directly by the hub device 101, to which speakers HP1 and HP2 are connected. Optionally, multiple users can connect to the hub device 101 in order to control the current playlist (with commands such as "Play", "Pause", "Stop", "Next", etc.). They also have the option of sending their own playlists with their own account data.

Figure 3:
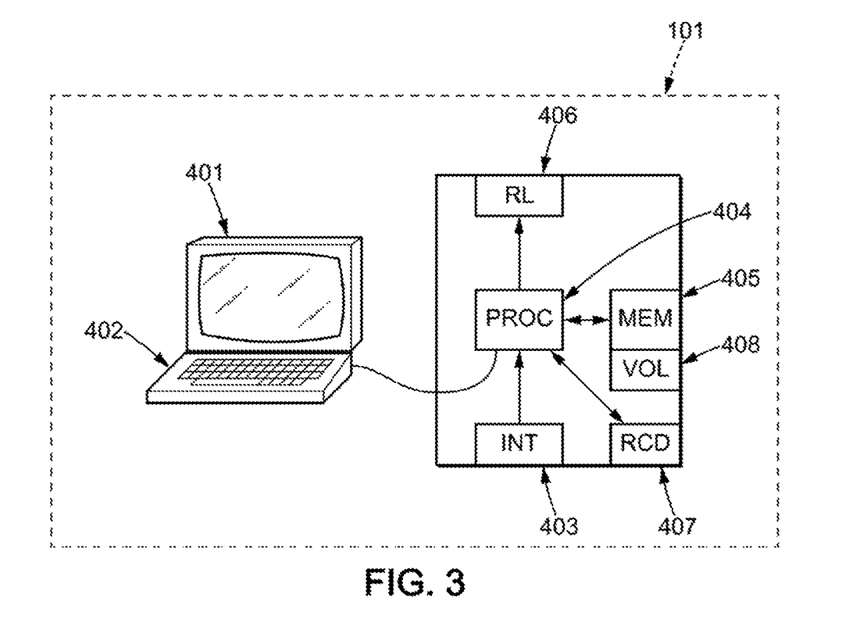
FIG. 3 illustrates a hub device in one embodiment of the disclosure.

Represented in FIG. 3 is a hub device 101 in one embodiment. In this embodiment, the device 101 comprises an electronic device, comprising:
- a memory unit including a first memory 405 (for example non-volatile) for storing instructions for implementing the method,
- and a second memory 408 (for example volatile) for storing the identification parameters for various remote services, in order to carry out the various steps of the method as described above.

The memory unit may further store, where appropriate, a stack of identifiers (IP addresses, data for logging in to devices on the LAN, etc.) and other data which may be temporary.

The computer further comprises a circuit 404. This circuit may be, for example:
- a processor capable of interpreting instructions in the form of a computer program, or
- a circuit board in which the steps of the method of the disclosure are defined in the silicon, or
- a programmable chip such as an FPGA (Field Programmable Gate Array) chip.

This device 101 comprises one or more interaction devices 403 enabling interaction as described above, an interface of a short-range network such as a Bluetooth or NFC interface, and an interface to a LAN 406 such as a WiFi network interface. Finally, the device 101 may optionally comprise, for easy user interaction, a screen 401 and a keyboard 402. The keyboard is optional, of course, particularly in the context of a device 101 having a touch screen for example.

The block diagram shown in FIG. 2*a* or 2*b* is a typical example of a program in which some instructions may be carried out in the device 101 described. As such, FIG. 2*a* or 2*b* can correspond to the flowchart of the general algorithm of a computer program within the meaning of the disclosure.

Of course, the disclosure is not limited to the embodiments described above by way of example; it extends to other variants.

Other embodiments are possible, including other applications for different remote services, and using ports of the device that are different from those described above.

The invention claimed is:

1. A hub device, comprising:
    an interface configured for communicating with a terminal using a short-range wireless connection;
    a circuit configured for:
    connecting to a remote service;
    receiving from the terminal a request to access the remote service, the access request comprising identification parameters for said service,
    storing in memory the identification parameters of the request received, in order to send to the remote service a second access request including the identification parameters,
    upon response from the remote service to the second request, transferring data relating to the service,
    and wherein the identification parameters of the request received from the terminal are stored temporarily in the memory,
    and wherein the hub device comprises a plurality of connection ports, and wherein the hub device is further configured for:
        identifying a port of the hub device based on the request, and
        upon response from the remote service to the second request, associating the identified port with the remote service.

2. The hub device according to claim 1, wherein the remote service includes use of data from the terminal, and wherein the hub device comprises at least one port for connecting to storage memory, and the circuit is further arranged for:
    receiving from the terminal the request to access the remote service, and data to be transferred to the remote service,
    identifying, based on the request, the port for connecting to the storage memory, in order to store in the storage memory the data received from the terminal, and
    upon response from the remote service, transferring the data from the storage memory to the remote service.

3. The hub device according to claim 2, wherein the circuit is further arranged to delete from the storage memory the data received from the terminal, at least upon detecting the end of a data transfer.

4. The hub device according to claim 1, wherein the remote service includes a transmission of multimedia data to be read by a multimedia rendering device, and wherein the hub device comprises at least one port for connecting to a multimedia rendering device, and the circuit is further arranged for:
    receiving from the terminal the request to access the remote service, identifying, based on the request, the port for connecting to a multimedia rendering device capable of reading a type of multimedia data associated with the request, and upon response from the remote service, transferring the data to said rendering device capable of reading the type of multimedia data associated with the request.

5. The hub device according to claim 1, further comprising a programming interface adapted for connecting to the remote service in order to send via the programming interface said second request to access the remote service, and wherein the programming interface uses a lookup table to identify a port of the device based on the request and to associate the identified port with the remote service.

6. The hub device according to claim 1, wherein the circuit is further configured to delete the identification parameters from memory, at least upon detection of the end of a data transfer.

7. The hub device according to claim 1, wherein the circuit is further configured to delete the identification parameters from memory after detecting a disconnection between the terminal and the hub device.

8. The hub device according to claim 1, wherein the circuit is configured to access the remote service via a gateway between a local area network and a wide area network, the remote service being accessed over the WAN.

9. A method for connecting to a remote service through a hub device, the hub device being configured for communicating with a terminal requesting access to the service via a short-range wireless connection, the hub device further being adapted for connecting to the remote service, wherein the method comprises the following acts implemented by the hub device:
  receiving from the terminal a request to access the remote service, the access request comprising identification parameters for said service,
  storing in memory the identification parameters of the request received, in order to send to the remote service a second access request comprising the identification parameters, and
  upon response from the remote service to the second request, transferring data relating to the service,
  wherein the storing in memory of the identification parameters of the request received from the terminal is temporary,
  and wherein the hub device comprises a plurality of connection ports, and wherein the method comprises furthermore comprises the following acts implemented by the hub device:
    identifying a port of the hub device based on the request, and
    upon response from the remote service to the second request, associating the identified port with the remote service.

10. A non-transitory storage medium storing a computer program product comprising instructions for implementing a method for connecting to a remote service through a hub device, when this program is executed by a processor, the hub device being configured for communicating with a terminal requesting access to the service via a short-range wireless connection, the hub device further being adapted for connecting to the remote service, wherein the instructions configure the hub device to perform the following acts:
  receiving from the terminal a request to access the remote service, the access request comprising identification parameters for said service,
  storing in memory the identification parameters of the request received, in order to send to the remote service a second access request comprising the identification parameters, and
  upon response from the remote service to the second request, transferring data relating to the service,
  wherein the storing in memory of the identification parameters of the request received from the terminal is temporary,
  and wherein the hub device comprises a plurality of connection ports, and wherein the instructions further configure the hub device to perform the following acts:
    identifying a port of the hub device based on the request, and
    upon response from the remote service to the second request, associating the identified port with the remote service.

* * * * *